US012749951B2

(12) United States Patent
Osdoba et al.

(10) Patent No.: US 12,749,951 B2
(45) Date of Patent: Sep. 29, 2026

(54) ROTOR FOR AN EXTERNALLY EXCITED SYNCHRONOUS MACHINE

(71) Applicant: MAHLE International GmbH, Stuttgart (DE)

(72) Inventors: Florian Osdoba, Stuttgart (DE); Penyo Topalov, Stuttgart (DE); Philipp Zimmerschied, Stuttgart (DE)

(73) Assignee: Mahle International GmbH (DE)

( * ) Notice: Subject to any disclaimer, the term of this patent is extended or adjusted under 35 U.S.C. 154(b) by 190 days.

(21) Appl. No.: 18/704,451

(22) PCT Filed: Sep. 6, 2022

(86) PCT No.: PCT/EP2022/074676
§ 371 (c)(1),
(2) Date: Apr. 24, 2024

(87) PCT Pub. No.: WO2023/072462
PCT Pub. Date: May 4, 2023

(65) Prior Publication Data

US 2025/0007358 A1 Jan. 2, 2025

(30) Foreign Application Priority Data

Oct. 25, 2021 (DE) ..................... 10 2021 211 992.1

(51) Int. Cl.

| | |
|---|---|
| ***H02K 11/042*** | (2016.01) |
| ***H01F 38/18*** | (2006.01) |
| ***H02K 1/26*** | (2006.01) |
| ***H02K 7/00*** | (2006.01) |
| ***H02K 19/02*** | (2006.01) |

(52) U.S. Cl.
CPC ........... *H02K 11/042* (2013.01); *H01F 38/18* (2013.01); *H02K 1/26* (2013.01); *H02K 7/003* (2013.01); *H02K 19/02* (2013.01); *H02K 2211/03* (2013.01)

(58) Field of Classification Search
CPC ........ H02K 11/042; H02K 1/26; H02K 7/003; H02K 19/02; H02K 2211/03; H01F 38/18
See application file for complete search history.

(56) References Cited

U.S. PATENT DOCUMENTS 4,603,344 A * 7/1986 Trommer ............ H02K 11/042 361/744
5,773,903 A 6/1998 McCabria
2015/0333679 A1* 11/2015 Box ........................ H02P 25/03 310/68 D

FOREIGN PATENT DOCUMENTS

AT 226802 B 4/1963
DE 1054590 B 4/1959
DE 2516505 A1 10/1976
(Continued)

OTHER PUBLICATIONS

English abstract for EP-2551999.
(Continued)

*Primary Examiner* — Sean Gugger
(74) *Attorney, Agent, or Firm* — Fishman Stewart PLLC

(57) ABSTRACT

A rotor for an externally excited synchronous machine, e.g., for use as a traction motor of a motor vehicle, is disclosed. The rotor includes rotor windings arranged on a rotor shaft having at least one cavity. A rectifier is electrically connected to the rotor windings. The rectifier is at least partly arranged in the cavity of the rotor shaft.

20 Claims, 5 Drawing Sheets

(56) References Cited

FOREIGN PATENT DOCUMENTS

| | | | |
|---|---|---|---|
| DE | 4017208 | A1 | 12/1991 |
| EP | 2551999 | A1 | 1/2013 |
| JP | S61502860 | A | 12/1986 |
| JP | H09266389 | A | 10/1997 |
| JP | 2014166138 | A | 9/2014 |

OTHER PUBLICATIONS

English abstract for DE-2516505.
Japanese Office Action dated Jun. 2, 2026 for Japanese Patent Application No. 2024-523857.

* cited by examiner

ROTOR FOR AN EXTERNALLY EXCITED SYNCHRONOUS MACHINE

CROSS-REFERENCE TO RELATED APPLICATIONS

This application claims priority to International Patent Application No. PCT/EP2022/074676 filed Sep. 6, 2022, which also claims priority to German Patent Application DE 10 2021 211 992.1 filed Oct. 25, 2021, the contents of each of which is hereby incorporated by reference in its entirety.

TECHNICAL FIELD

The invention relates to a rotor for an externally excited synchronous machine. The invention additionally relates to an externally excited synchronous machine comprising such a rotor.

BACKGROUND

In an inductive electrically excited synchronous machine, the energy for a rotor winding is transmitted from a stator to a rotor by means of an inductive transmitter (rotary transformer). An alternating current is required for the inductive transmission according to the transformational principle. This alternating current has to be rectified subsequently in a rectifier, so that a direct current applies at the rotor, for the purpose of which electronic components, such as, for example, a printed circuit board, fitted with different electronic components, are arranged on the rotating part of the machine (rotor), which is also referred to as rotating rectifier. In addition to the rectifier, further circuits and components (e.g., protective circuits) can also be arranged on the printed circuit board. This rotating rectifier can be attached to the rotor shaft as separate component.

The electronic components arranged on the printed circuit board of the rectifier experience high centrifugal forces during the operation, which increase strongly with increasing rotational speed of the rotor and an arrangement on a larger diameter of the printed circuit board, which can have the result that the electronic components or the soldering points thereof are damaged during the operation by the acting centrifugal forces, which can lead to an error during operation or the failure of the synchronous machine. By means of a housing and the arrangement of the rectifier on the rotor shaft, the diameter, on which the electronic components can be arranged, is limited downwards, however. In a target design, with a correspondingly high maximum rotational speed, certain electronic components can thus no longer be used for the setup of the rectifier due to their properties (housing type, weight, surface and type of the soldered joint).

Different losses (for example copper and iron losses) additionally develop during the operation in the rotor, whereby the rotor heats up. The temperature is thereby generally limited by an upper temperature limit of the insulation materials (e.g., insulation paper, enameled copper wire, etc.), which lies in the range from 140-180° C. Due to the positioning of the rectifier close to the rotor winding, the ambient temperatures of the rectifier are thus decisively determined by the upper temperature limit of the rotor. The power loss developing in the rectifier has to additionally be discharged. Due to the fact that the upper temperature limit of common electronic components and printed circuit board materials lies below the temperature limit of the rotor, the upper temperature limit of the rotor thus has to be reduced to the upper temperature limit of the electronic components, whereby the continuous and peak power of the motor has to be reduced and/or expensive electronic components and printed circuit board materials have to be used, which have a correspondingly high temperature limit.

The present invention thus deals with the problem of specifying an improved or at least an alternative embodiment for a rotor of the generic type, which in particular overcomes the disadvantages known from the prior art.

This problem is solved according to the invention by the subject matter of the independent claim(s). Advantageous embodiments are subject matter of the dependent claims.

SUMMARY

The present invention is based on the general idea of reducing centrifugal forces acting on a rectifier of a rotor for an electrically externally excited synchronous machine in that the rectifier is arranged within a rotor shaft of the rotor. Due to this compact construction radially relatively tightly to an axis of rotation of the rotor, the centrifugal forces developing during operation, that is, in response to a rotation of the rotor, can be reduced. The rotor according to the invention for the externally excited synchronous machine thereby has the above-mentioned rotor shaft having at least one cavity, on the outer jacket surface of which rotor windings are arranged. A rectifier electrically connected to the rotor windings is likewise provided.

According to the invention, the rectifier is now arranged within the hollow rotor shaft or a cavity of the rotor shaft, respectively. An improvement of the mechanical stability can be achieved thereby by arrangement of the rectifier on very small diameters. It is furthermore possible to utilize an installation space, which was not utilized to date within the hollow rotor shaft, whereby the synchronous machine as a whole can be constructed more compactly. A simple assembly can also be achieved by means of a simple insertion of the rectifier into the cavity by means of this arrangement.

In the case of an advantageous further development of the rotor according to the invention, a shaft end, which is at least partly hollow, comprising an interior space is provided, wherein in this case, the rectifier is arranged in the interior space of the shaft end and the shaft end, in turn, is arranged in the cavity of the rotor shaft, in particular pressed into it. This embodiment makes it possible to prefabricate the shaft end comprising the rectifier arranged therein in the interior space in a separate assembly process and to fix it to the hollow rotor shaft as prefabricated assembly. It goes without saying that it is also conceivable thereby that a bearing for supporting the rotor shaft or the rotor, respectively, is additionally also arranged on the shaft end. A connection between the shaft end and the hollow rotor shaft can take place thereby by means of a simple pressing of the hollow shaft end into the hollow rotor shaft, wherein the hollow rotor shaft has radial openings, which are aligned with likewise radial openings of the shaft end in the installed state and via which an electrical connection can be created between the rectifier and the rotor windings. Alternatively to a pressing in, the shaft end can purely theoretically also be fixed in the cavity of the rotor shaft by means of an adhering, welding or soldering.

If a shaft end of this type is not provided, the rectifier can be arranged directly in the cavity of the rotor shaft, wherein a support of the rotor shaft and thus of the rotor takes place in this case via, for example, a bearing arranged on the rotor shaft.

Alternatively, a sleeve can also be provided, wherein the rectifier is arranged in the sleeve and the sleeve, in turn, is at least partly arranged in the cavity of the rotor shaft, in particular pressed into it. An embodiment of this type, in the case of which the rectifier is arranged in the sleeve, provides for a prefabrication of the sleeve with the rectifier installed therein and thus the production of a prefabricated assembly group, which can subsequently be assembled in the rotor shaft. In particular a shorter assembly time of the rotor can be achieved thereby.

The rectifier is expediently formed as plug-in printed circuit board comprising diodes arranged on one side or both sides. In particular by means of an arrangement of the diodes required for the rectifier circuit or of further electronic components, respectively, on both sides, it is possible to achieve an arrangement, which balances the centrifugal force, of the electronic components, on the plug-in printed circuit board, provided that an axis of rotation of the rotor shaft is identical to an axis of rotation lying in the plug-in printed circuit board. By means of in particular the arrangement of the electrical components on both sides on the plug-in printed circuit board, said components preferable balance each other with regard to their centrifugal forces developing in response to the rotation.

In the case of a further advantageous embodiment of the rotor according to the invention, longitudinal slits running in the axial direction, into which the plug-in printed circuit board, that is, the rectifier, can be inserted and fixed therein, are provided in a wall of the cavity of the rotor shaft or, if present, in a wall of the interior space of the hollow shaft end or, if present, in a wall of the sleeve. This provides for a comparatively simple assembly of the rectifier in the sleeve, the shaft end or the rotor shaft by means of a simple insertion. The longitudinal slits can thereby be formed in such a way that the plug-in printed circuit board is pressed therein and is thus held therein via a press fit. It goes without saying that additionally or alternatively, the plug-in printed circuit board of the rectifier can also be held in the respective longitudinal slits or longitudinal grooves, respectively, via an adhesive. Alternatively, it is also conceivable that longitudinal openings, which run in the axial direction and which are injection-molded with plastic, are provided in a wall of the cavity of the rotor shaft or in a wall of the interior space of the shaft end, wherein longitudinal slits running in the axial direction, into which the plug-in printed circuit board of the rectifier is inserted and fixed, are provided in the plastic. It is possible thereby, for example, to form the longitudinal openings or longitudinal grooves, respectively, to be larger and to adapt the longitudinal slits, which are subsequently introduced into the plastic filling, to corresponding dimensions of the respectively used rectifier or the plug-in printed circuit board thereof, respectively. An elastic plastic can also be used thereby, so that the plug-in printed circuit board can be formed with an oversize to the longitudinal slit and can be pressed into the latter, whereupon the elastic spring force of the plastic then holds the plug-in printed circuit board and the rectifier thereabove. All described embodiments thereby have in common that a comparatively simple and quick assembly of the rectifier in the sleeve, the interior space or the cavity is possible via the longitudinal slits.

In the case of an advantageous further development of the rotor according to the invention, the rectifier has electrical contacts arranged on the longitudinal end side, that is, on the longitudinal end side in the axial direction, for contacting with a contacting counterpiece. Electrical contacts of this type arranged in an axial front side provide for an electrical contacting in response to the insertion into the rotor shaft, whereby no further operating steps are required for the contacting.

The electrical contacts can be formed, for example, as contact pins, as plug contacts or as spring contacts. A comparatively simple electrical contacting, which can be achieved by means of an insertion, can be realized via contact pins as well as plug contacts. Spring contacts furthermore offer the large advantage that they can balance certain dimensional tolerances.

Additionally or alternatively, the rectifier and the contacting counterpiece can also be fixed to one another via a locking mechanism, for the purpose of which latching elements can be provided, for example, on the rectifier and mating latching elements on the contacting counterpiece. A reliable axial fixation of the rectifier in the sleeve or the shaft end, respectively, or the rotor shaft can be achieved thereby, whereby an unwanted release and an opening of the electrical contacts can be ruled out reliably. Latching elements or mating latching elements of this type, respectively, can be formed as simple latching hooks made of plastic, which can in particular be arranged on the contacting counterpiece in one piece and can thus be produced together therewith, for example in a plastic injection molding process. The mating latching elements or latching elements, respectively, cooperating therewith can be formed as simple undercut contours, wherein it lends itself in the present case to embody undercut contours of this type on the plug-in printed circuit board and the corresponding latching lugs on the contacting counterpiece.

Expediently, an end piece or a cover is provided, which fixes the rectifier. An end piece or a cover, respectively, of this type can thus cooperate with the plug-in printed circuit board of the rectifier on an axially opposite longitudinal end of the contacting counterpiece and can thus fix the rectifier in the axial direction between the cover or the end piece, respectively, on the one hand, and the contacting counterpiece on the other hand. It goes without saying that an end piece of this type can also be formed as a simple web, which crosses the sleeve, the interior space or the cavity.

In the case of a further advantageous embodiment of the rotor according to the invention, a thermally conductive and electrically insulating material is arranged between the rectifier and the rotor shaft. By means of the arrangement of the electronic components of the rectifier, which are provided comparatively close to an axis of rotation, a required electrical insulation can already be achieved via the air lying between these components and a wall of the sleeve or of the interior space, respectively, or of the cavity. Even though air is a good electrical insulator, it is also a poor heat conductor, which, however, is why it lends itself in the present case to additionally provide a thermally conductive material, in order to quickly emit the heat developing in response to the operation of the rectifier to the rotor shaft and to thus cool the rectifier or the electronic components thereof, respectively. It is possible thereby to hold the rectifier or the electronic components thereof, respectively, in a temperature window, which is optimal for the operation.

Expediently, cooling ducts for a coolant are provided in the rotor shaft or the shaft end. To additionally support a cooling of the rectifier or of the electronic components thereof, respectively, the rotor shaft can be cooled additionally, whereby it goes without saying that, alternatively, a direct application of the rectifier with a dielectric coolant is also conceivable, which provides for a once again significantly improved cooling. If the rectifier or the electronic components thereof, respectively, comes directly into contact with the coolant, the latter must not be electrically conductive, while water, water-glycol or oil is also conceivable in response to an indirect cooling via coolant running in the rotor shaft or the shaft end in corresponding cooling ducts. For cooling purposes, it is in particular also conceivable that the plug-in printed circuit board or generally the printed circuit board, respectively, and the rectifier thereabove are integrated into a rotor cooling, via which the rotor is cooled. This usually takes place by a flow-through of a hollow rotor shaft with coolant, wherein, in this case, the rectifier can be arranged in the hollow rotor shaft and the dielectric coolant can be applied directly thereto. It is only important to note thereby that the printed circuit board or the plug-in printed circuit board, respectively, of the rectifier as well as the electronic components thereof have to be resistant against the coolant.

The present invention is further based on the general idea of equipping an externally excited synchronous machine with a rotor, which can be electrically supplied with current, according to the preceding paragraphs, wherein a rotary transformer rotor of a rotary transformer comprising a secondary coil is simultaneously arranged on the rotor, while a corresponding rotary transformer stator is arranged on the externally excited synchronous machine, in particular on the housing thereof. The rotary transformer rotor can thereby be arranged on the rotor shaft on the outside. It is also conceivable purely theoretically to arrange the rotary transformer rotor as well as the rotary transformer stator within the at least partly hollow rotor shaft.

By means of the arrangement of at least the rectifier within the rotor shaft, a significant improvement of the mechanical stability can be achieved because said rectifier can be placed onto a very small pitch diameter and thus experiences low centrifugal forces during operation.

In the case of an advantageous further development of the externally excited synchronous machine, the rotary transformer stator has a primary coil and a transformation core made of a magnetic core material, in particular of a ferrite. The rotary transformer stator thereby has the primary coil, which cooperates with the secondary coil of the rotary transformer rotor.

Further important features and advantages of the invention follow from the subclaims, from the drawings and from the corresponding figure description on the basis of the drawings.

It goes without saying that the above-mentioned features and the features, which will be described below, cannot only be used in the respective specified combination but also in other combinations or alone, without leaving the scope of the present invention.

BRIEF DESCRIPTION OF THE DRAWINGS

Preferred exemplary embodiments of the invention are illustrated in the drawings and will be described in more detail in the following description, in which, in each case schematically.

DETAILED DESCRIPTION

Figure 1:
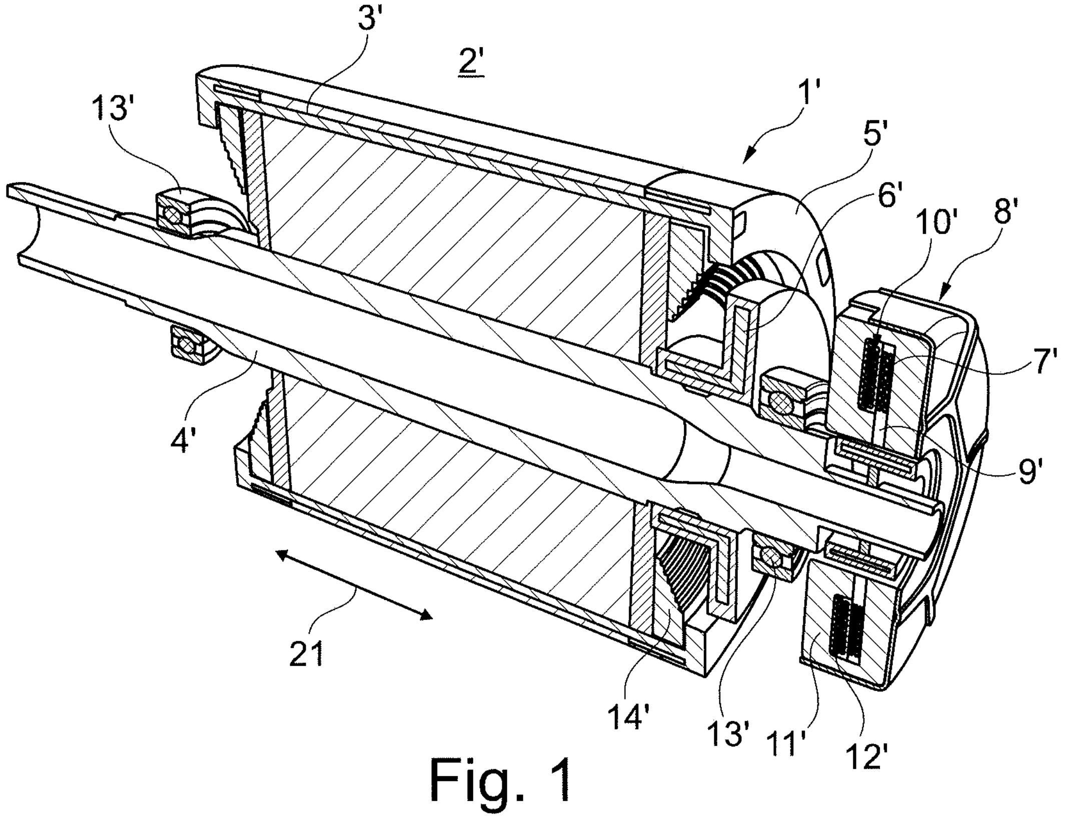
FIG. 1 shows a longitudinal sectional illustration through a rotor according to the prior art.

According to FIG. 1, a rotor 1' for an externally excited synchronous machine 2' has rotor windings 3', which are arranged on a rotor shaft 4'. The rotor 1' likewise has a balancing ring 5' as well as a rectifier 6', wherein imbalances optionally developing via the balancing ring 5' can be compensated. The rectifier 6', in turn, rectifies the electrical current, which is transmitted from a rotary transformer 8' to a secondary coil 7', which is connected in a rotationally fixed manner to the rotor shaft 4'. The rectifier 6' converts this electrical current into direct current and transmits it to the rotor windings 3', where an electrical magnetic field can be created there. The secondary coil 7' is thereby part of a rotary transformer rotor 9', which, together with a stationary rotary transformer stator 10', forms the rotary transformer 8'. The rotary transformer stator 10' has a transformer core 11' as well as a primary coil 12'. The transformer core 11' is thereby made of a magnetic core material, for example a ferrite. The rotor 1' is supported via bearings 13'. End windings 14', via which an electrical contacting with the rectifier 6' takes place, are in each case provided on the front side of the rotor windings 3'.

It is disadvantageous in the case of the rotor 1' known from the prior art according to FIG. 1 that the rectifier 7' has a comparatively large diameter outside of the rotor shaft 4', whereby an increased installation space need is created on the one hand and comparatively high forces in the form of centrifugal forces, which act on the rectifier 6' during operation, develop on the other hand. During the operation, different losses (for example copper and iron losses) furthermore develop in the rotor 1', whereby the rotor 1' heats up. The temperature is thereby limited by an upper temperature limit of the insulation materials (e.g., insulation paper, enameled copper wire, etc.), which lies in the range from 140-180° C. By means of the positioning of the rectifier 6' close to the rotor winding 3', the ambient temperatures of the rectifier 6' are decisively determined by the upper temperature limit of the rotor 1'. Due to the fact that the upper temperature limit of the rectifier 6' lies below the temperature limit of the rotor 1', the upper temperature limit of the rotor 1' thus has to be reduced to the upper temperature limit of the electronic components, whereby the continuous and peak performance of the synchronous machine 2' has to be reduced and/or expensive electronic components and printed circuit board materials have to be used, which have a correspondingly high temperature limit.

The rotor 1 according to the invention will now be described in more detail below according to FIGS. 2, 3 and 7 to 9. It is important to note thereby that the reference numerals used with regard to FIGS. 2 to 10 are used analogously to FIG. 1, but without apostrophe.

Figure 2:
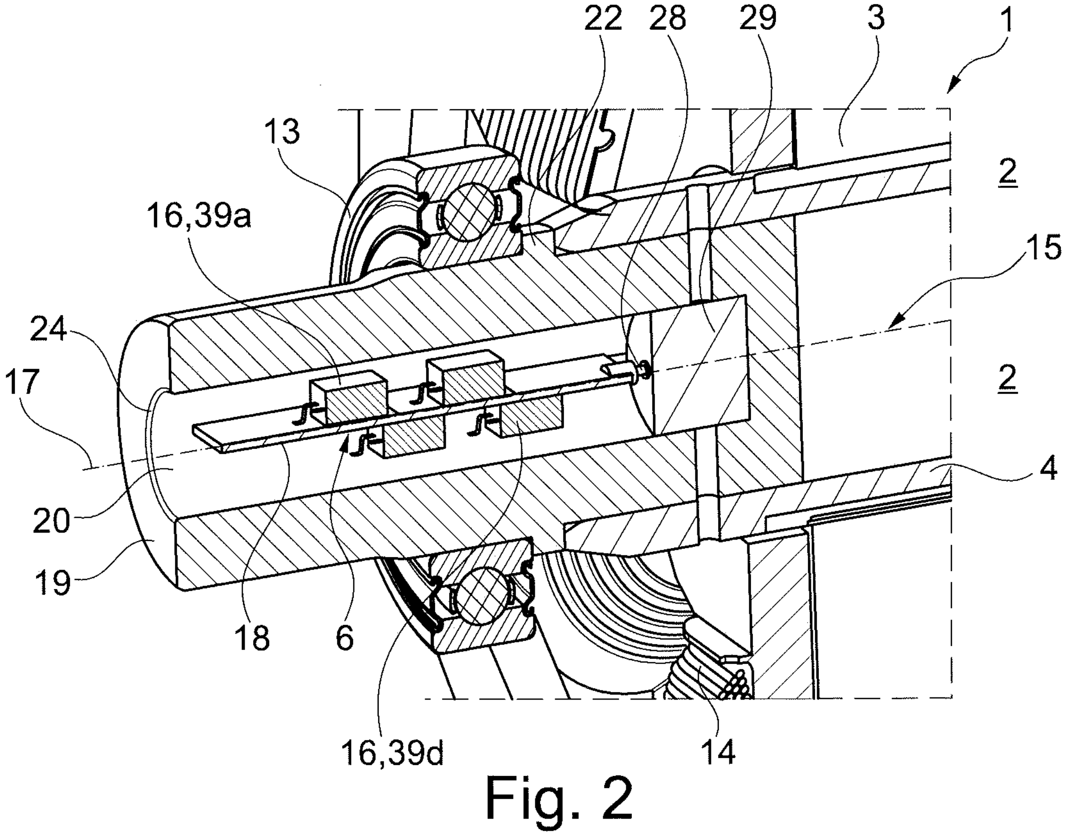
FIG. 2 shows a sectional illustration through a rotor according to the invention comprising a rectifier arranged within a rotor shaft.

To now at least reduce the disadvantages known from the prior art with regard to the centrifugal forces acting on the rectifier 6 in response to the rotation of the rotor 1 as well as a strong heat-up thereof, the rectifier 6 is arranged in a cavity 15 of the rotor shaft 4 in the case of the rotor 1 according to the invention according to FIG. 2, 3 as well as 7 to 9. It is possible thereby to arrange individual components 16 of the rectifier 6, such as diodes, for example, as well as the entire rectifier 6 close to an axis of rotation 17 of the rotor 1, whereby the individual components 16 and the entire rectifier 6, compared to the arrangement shown according to FIG. 1, have to absorb significantly fewer mechanical forces, in particular centrifugal forces. By means of an arrangement of the rectifier 6 in the cavity 15 of the rotor shaft 4, a significantly improved cooling and thus heat-up of the rectifier 6 can additionally take place, whereby an increased continuous and peak performance of the synchronous machine 2 is made possible. Due to the improved cooling of the electronic components 16 or generally of the rectifier 6, respectively, more cost-efficient electronic components 16 and printed circuit board materials can also be used for a plug-in printed circuit board 18 of the rectifier 6.

Figure 3:
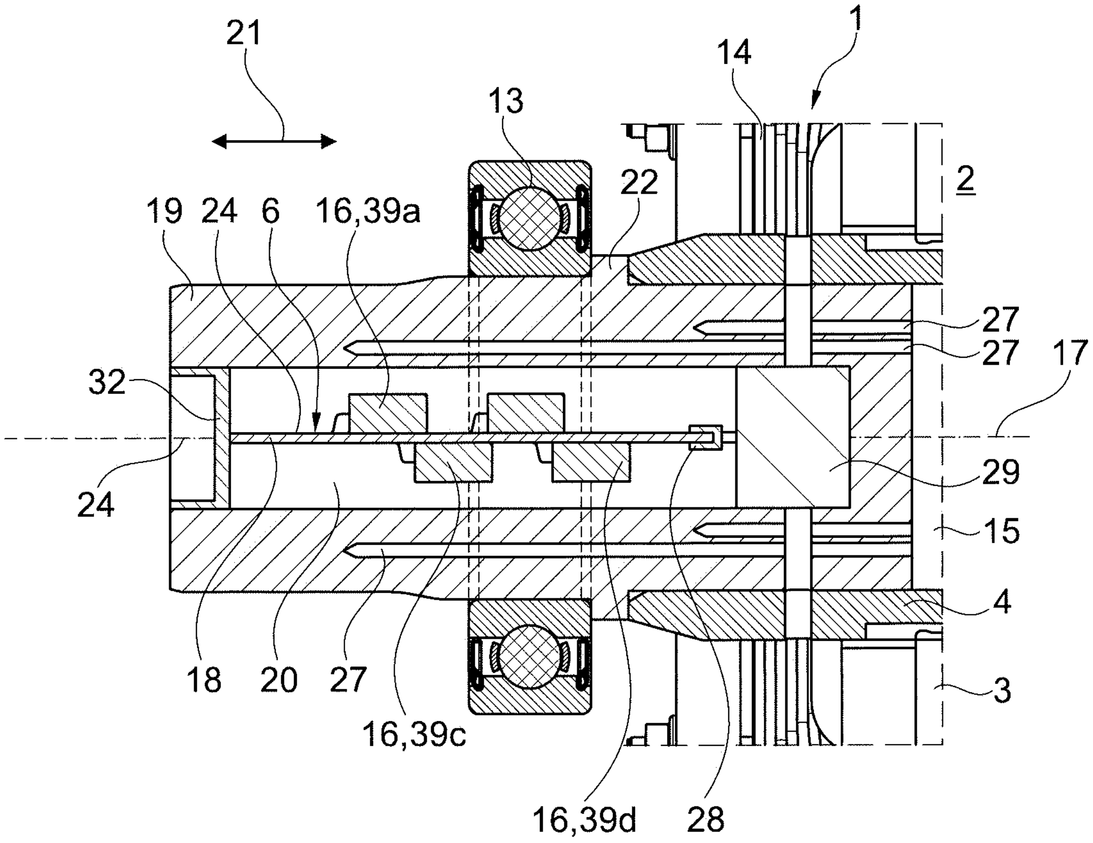
FIG. 3 shows a sectional illustration as in FIG. 2, but in a different sectional plane.
Figure 4:
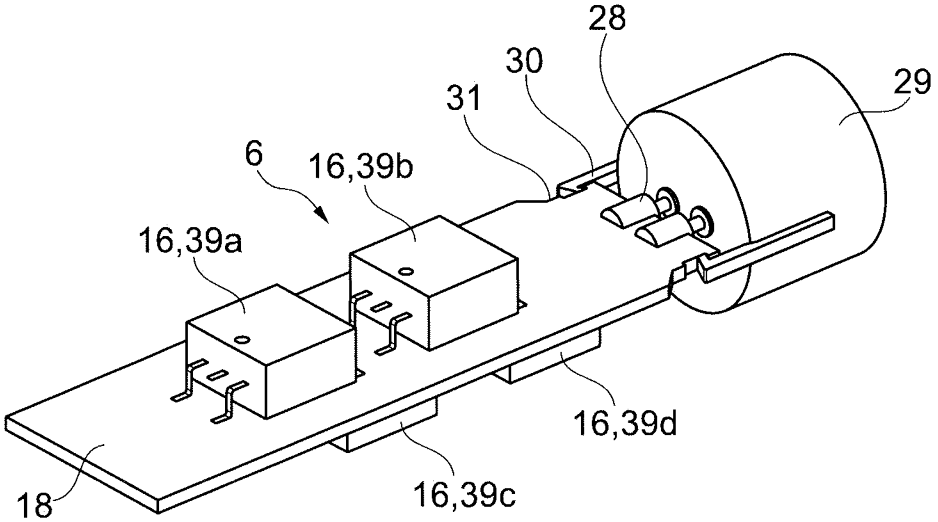
FIG. 4 shows a rectifier comprising a contacting counterpiece in an oblique view.
Figure 5:
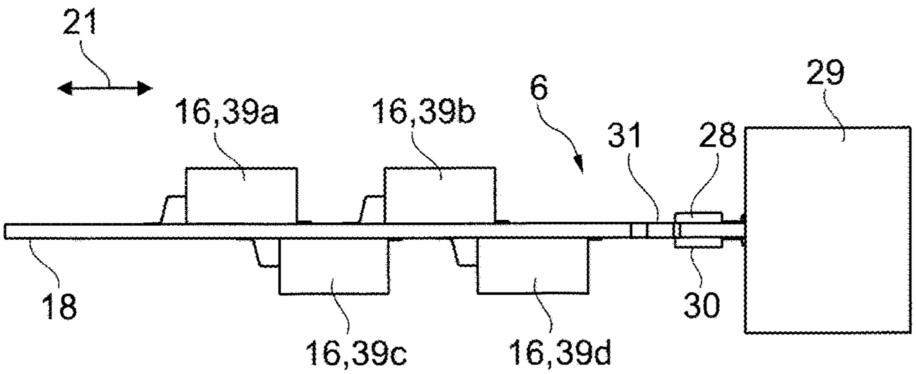
FIG. 5 shows an illustration as in FIG. 4, but in a side view.
Figure 6:
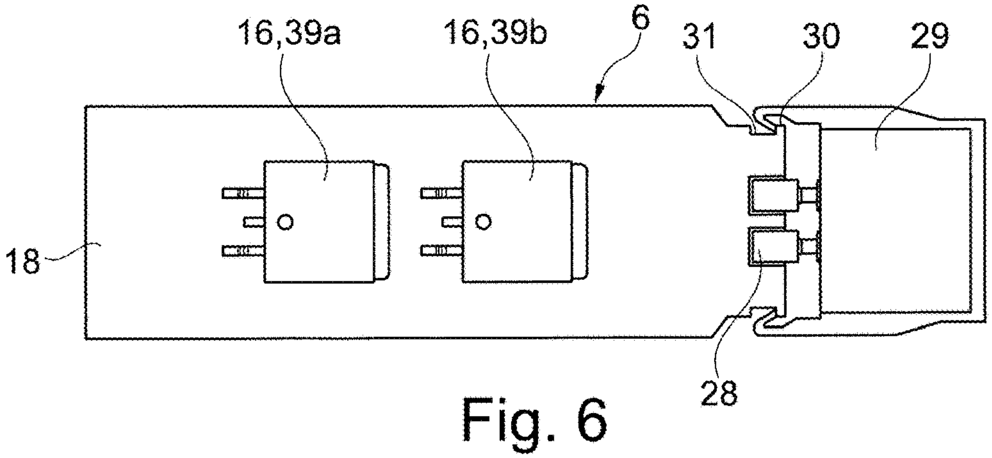
FIG. 6 shows an illustration as in FIG. 4, but in a top view.
Figure 7:
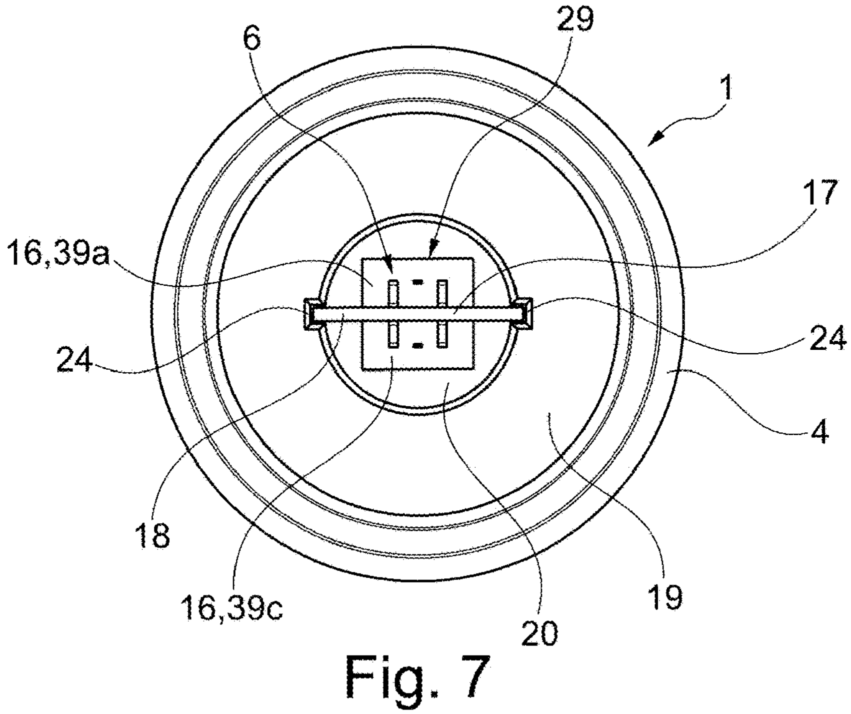
FIG. 7 shows a frontal view onto a shaft end comprising a rectifier inserted into longitudinal slits of the shaft end.
Figure 8:
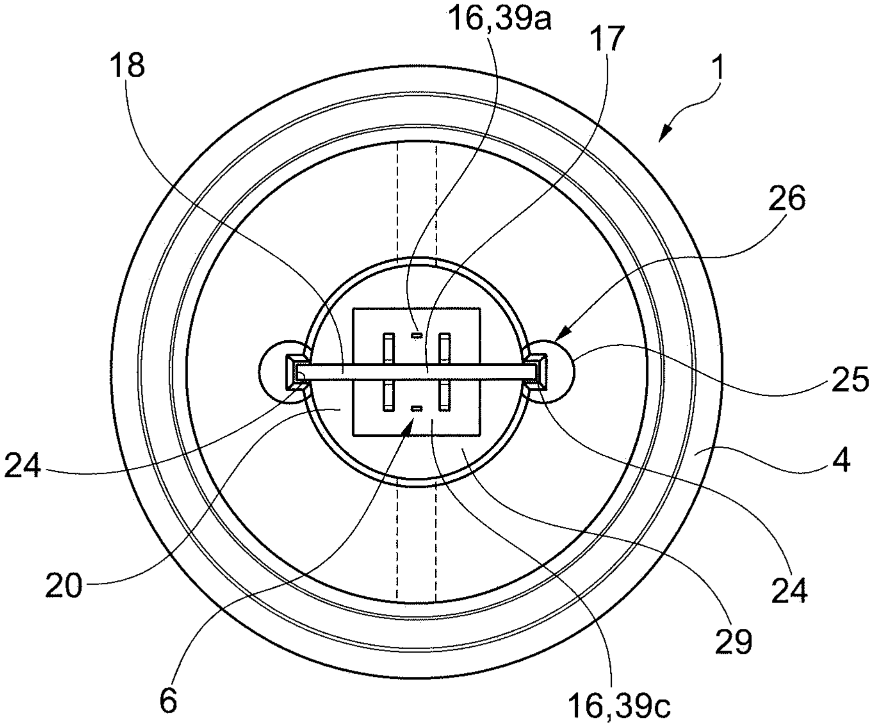
FIG. 8 shows an illustration as in FIG. 7, but with longitudinal openings, which run in the axial direction and which are injection-molded with plastic, into which longitudinal slits are incorporated, into which, in turn, a plug-in printed circuit board of the rectifier is inserted and fixed therein.
Figure 9:
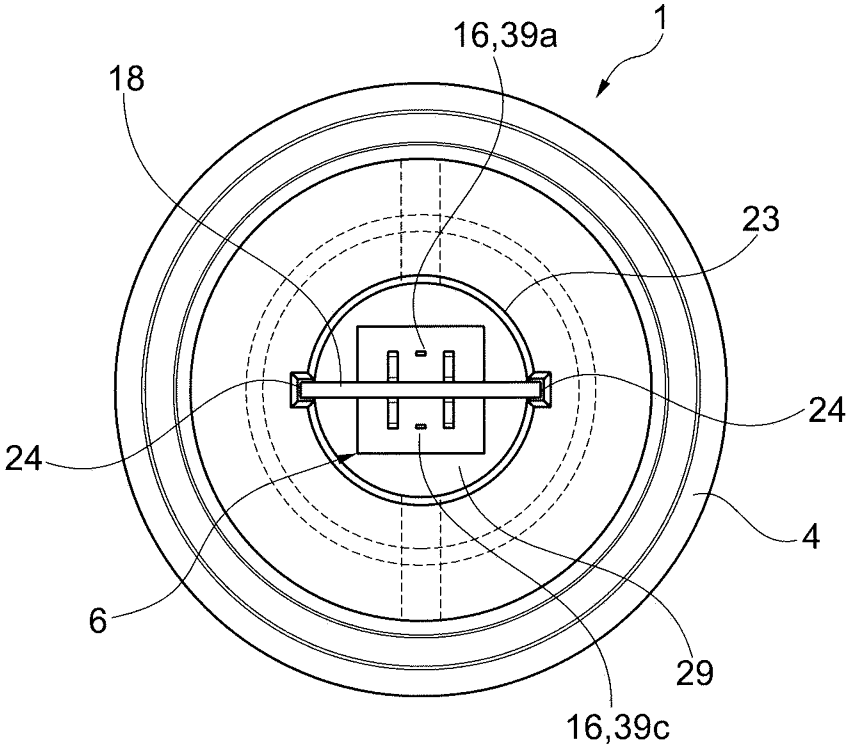
FIG. 9 shows an illustration as in FIG. 7, but comprising a sleeve, wherein the rectifier is arranged in the sleeve.

In the case of the illustrations of the rotor 1 according to the invention according to FIG. 2, 3 as well as 7 to 9, a shaft end 19, which is at least partly hollow, comprising an interior space 20 is provided, wherein, in these cases, the rectifier 6 is arranged in the interior space 20 of the shaft end 19, and the shaft end 19 in turn, is arranged in the cavity 15 of the rotor shaft 4, for example pressed into it. It can be gathered from FIGS. 2 and 3 thereby that the rectifier 6 is only partly arranged within the cavity 15 of the rotor shaft 4 in the axial direction 21, whereby according to the present application, however, an at least partial arrangement of the rectifier 6 in the cavity 15 of the rotor shaft 4 is to also be considered as being comprised by the invention.

The shaft end 19 has a radial step 22, in the manner of a collar, which forms an axial stop in response to pressing the shaft end 19 into the rotor shaft 4. The radial step 22 simultaneously forms an axial stop for a bearing 13, for example a ball bearing, which is applied, for example, pressed on to an outer jacket surface of the shaft end 19.

The rectifier 6 illustrated according to FIGS. 2 to 9 thereby has the above-mentioned plug-in printed circuit board 18, on which in the present case the electronic components 16, that is, in the present case the diodes, are arranged on both sides. It goes without saying that purely theoretically, a one-sided arrangement is also conceivable, whereby a two-sided arrangement is favorable with respect to an imbalance developing in response to the rotation.

Additionally or alternatively to the shaft end 19, a sleeve 23 (see FIG. 9) can also be provided, wherein the rectifier 6 is arranged in the sleeve 23 and the sleeve 23, in turn, is arranged in the cavity 15 of the rotor shaft 4 or in the interior space 20 of the shaft end 19.

To provide for an assembly, which is as simple as possible, and simultaneously for a reliable fixation of the rectifier 6 in the cavity 15 or the interior space 20, respectively, or the sleeve 23, longitudinal slits 24 running in the axial direction 21, into which the plug-in printed circuit board 18 can be inserted and fixed therein, for example clamped, adhered or pressed (see FIGS. 2, 3, 7 and 9), are provided in a wall of the cavity 15, of the interior space 20 or of the sleeve 23. Alternatively, it is also conceivable that longitudinal bores or generally longitudinal openings 26, respectively, which run in the axial direction 21 and which are injection-molded with plastic 25, are provided in a wall of the cavity 15 or of the interior space 20 (see FIG. 8), wherein longitudinal slits 24, which run in the axial direction 21 and into which the plug-in printed circuit board 18 is inserted and fixed therein, are provided in the plastic 25. In particular in the case of the longitudinal slits 24 in the plastic 25, the longitudinal slits 24 can be produced with an oversize compared to the plug-in printed circuit board 18, whereby an elastic pressing of the plug-in printed circuit board 18 in response to the insertion into the longitudinal slits 24 of the plastic 25 and thus a reliable fixation takes place.

By means of the arrangement of the rectifier 6 or the electronic components 16 thereof, respectively, close to the axis of rotation 17, a sufficiently large clearance remains between the electronic components 16 and the rotor shaft 4 or the shaft end 19, respectively, or the sleeve 23, which can be filled, for example, with air and thus ensures an electrical insulation. The centrifugal forces acting on the rectifier 6 can thereby also be reduced. Alternatively, a thermally conductive and insulating material, which provides for a cooling of the electronic components 16 of the rectifier 6 and thus holds the latter in a temperature window, which is optimal for the operation, can be arranged between the rectifier 6 and the sleeve 23 or the rectifier 6 and the shaft end 19 or between the rectifier 6 and the rotor shaft 4.

To be able to further improve the cooling of the rectifier 6, cooling ducts 27 (see in particular FIG. 3) can be provided in the rotor shaft 4 and/or the shaft end 19. A cooling fluid, for example water, oil or a water-glycol mixture, can be guided through these cooling ducts 27 and an indirect cooling of the rectifier 6 can thus be achieved by means of a direct cooling of the rotor shaft 4 or of the shaft end 19, respectively.

It goes without saying that, alternatively, it is also conceivable that a coolant is applied directly to the rectifier 6 and in particular to the electronic components 16 thereof, wherein said coolant has to be embodied dielectrically, that is, electrically non-conductive, in this case, in order to rule out short-circuits. A direct cooling of this type is extremely effective and can also be integrated, for example, into an already existing rotor cooling. In this case, coolant thus flows directly through the cavity 15 of the rotor shaft 4 or the interior space 20 of the shaft end 19, respectively, or a space within the sleeve 23.

To achieve an electrical contacting of the rectifier 6 with the rotor windings 3 on the one hand and with the rotary transformer 8 on the other hand, the rectifier 6 can have electrical contacts 28 arranged on the longitudinal end side for the electrical contacting with a contacting counterpiece 29. The electrical contacts 28 arranged on the front end side in the axial direction 21 thereby provide for a comparatively simple assembly or electrical contacting, respectively, with the contacting counterpiece 29 by means of a simple plug-in or insertion, respectively.

The electrical contacts 28 can be formed thereby, for example, as contact pins, as plug contacts or as spring contacts, wherein all of the mentioned embodiments allow for balancing certain dimensional tolerances, whereby an assembly is significantly simplified.

To be able to ensure a reliable and long-lasting electrical contacting of the rectifier 6 with the contacting counterpiece 29 and furthermore with the rotary transformer 8 as well as with the rotor windings 3, latching elements 30 can be provided on the rectifier 6 or on the plug-in printed circuit board 18 thereof, respectively, and mating latching elements 31 can be provided on the contacting counterpiece 29 for locking purposes. The latching elements 30 can thereby be formed as latching hooks or as undercut contours, while the mating latching elements 31 can be formed as undercut contours or latching hooks, respectively, formed complementary thereto. In the present case, the latching elements 30 on the plug-in printed circuit board 18 of the rectifier 6 are formed as undercut contours and the mating latching elements 31 on the contacting counterpiece 29 as latching hooks, as it is illustrated according to FIGS. 4 to 6.

An end piece or a cover 32 (see FIG. 3), which is arranged so as to preferably lie opposite the contacting counterpiece 29, and which clamps the rectifier 6 between itself and the contacting counterpiece 29 and thus simultaneously also fixes an electrical contacting between the rectifier 6 and the contacting counterpiece 29, can furthermore also be provided. The end piece or the cover 32, respectively, can be pressed, for example, into the interior space 20 (see FIG. 3) or optionally into the sleeve 23 or the cavity 15 of the rotor shaft 4, respectively. A synchronous machine 2 according to the invention, which is externally excited, equipped by means of the rotor 1 according to the invention, thereby provides for a high performance with simultaneously cost-efficient construction, whereby, in addition to installation space advantages, a reduction of the mechanical load and an improved cooling of the rectifier 6 or the electronic components 16 thereof, respectively, and thus a performance increase of the synchronous machine 2 can also be achieved by means of the arrangement of the rectifier 6 at least partly within the cavity 15 of the rotor shaft 4.

The synchronous machine 2 according to the invention comprising the rotor 1 according to the invention can be used as traction motor in a motor vehicle.

Figure 10:
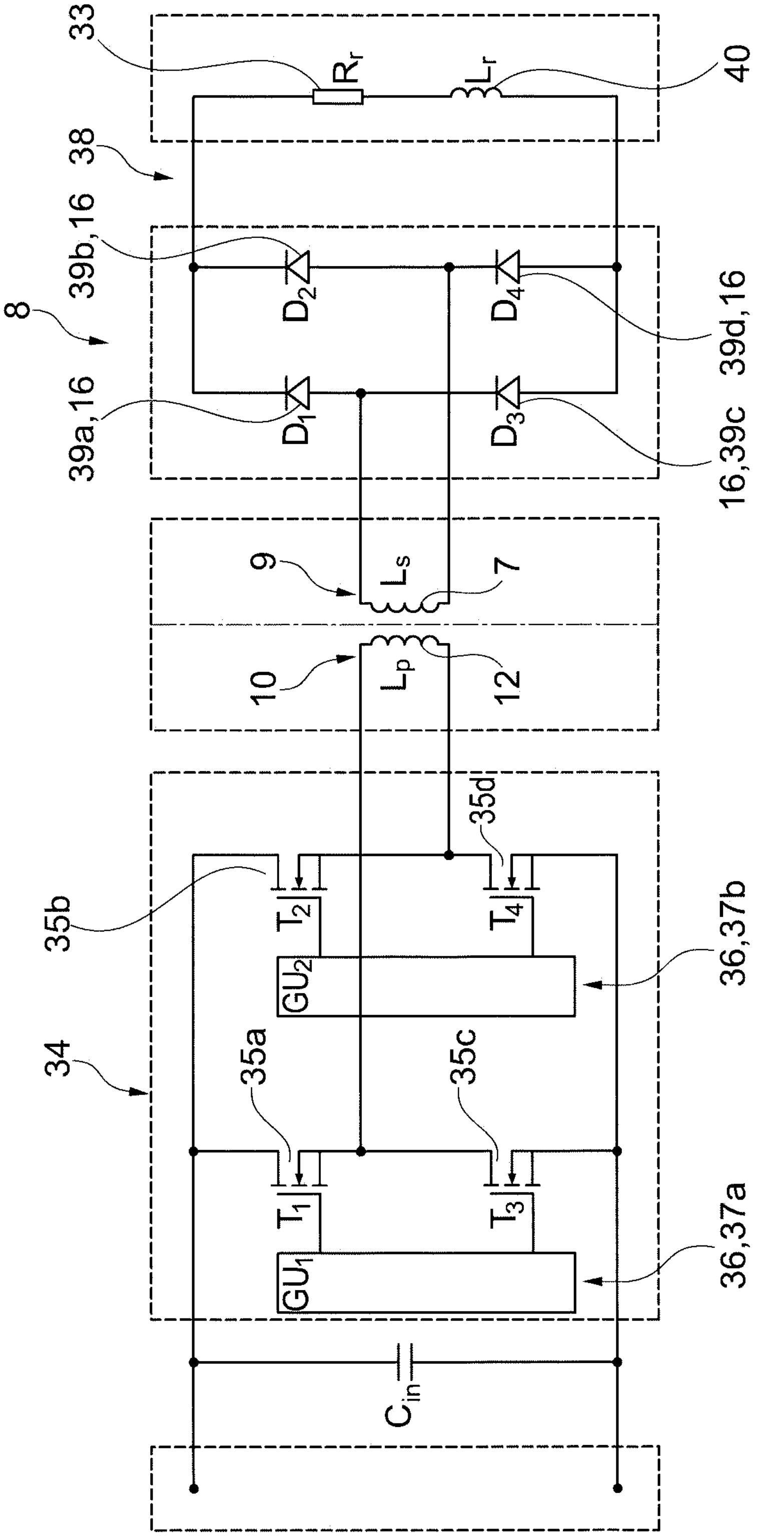
FIG. 10 shows an electrical wiring of an electrical rotary transformer in a circuit diagram-like illustration.

A circuit diagram-like illustration of a possible electronic wiring of an electrical rotary transformer 8 inserted in the synchronous machine 2 according to the invention will now also be described below on the basis of FIG. 10.

On the primary side, the rotary transformer 8 comprises a rotary transformer stator 10 comprising a primary coil 12. On the secondary side, the rotary transformer 8 further comprises a rotary transformer rotor 9, which is formed so as to be capable of being rotated relative to the rotary transformer stator 10 about the axis of rotation 17 and which has the secondary coil 7. The secondary coil 7 is inductively coupled to the primary coil 12. For the electrical energy transmission from the primary coil 12 to the secondary coil 7, it is required to generate an electrical alternating current in the primary coil 12. The electrical alternating current required for this purpose is generated by means of a transistor circuit 34, which is arranged on the primary side and which is electrically connected to the primary coil 12. The transistor circuit 34 can comprise four power transistors 35*a*, 35*b*, 35*c*, 35*d*, which are controlled via a control device 36 comprising two integrated circuits 37*a*, 37*b*. In response to electrical current supply of the primary coil 33 with an electrical alternating current, an electrical alternating current is also induced in the secondary coil 7. The secondary coil 7 is electrically connected to an electrical rectifier circuit 38 of the rectifier 6, which, in the example, comprises four electronic components 16 formed as rectifier elements 39*a*, 39*b*, 39*c*, 39*d*, and by means of which the induced electrical alternating current can be converted into an electrical direct current. The four rectifier elements 39*a*-39*d* can in each case be formed by a rectifier diode. The electrical direct current generated in this way serves the purpose of electrically supplying current to the rotor 1 of the electrical synchronous machine 2, which is suggested schematically in FIG. 10 by means of an inductive resistor identified with reference numeral 40 and an ohmic resistor identified with reference numeral 33.

All in all, the following advantages can be achieved by means of the rotor 1 according to the invention and the synchronous machine 2 according to the invention:

An improvement of the mechanical stability because the rectifier 6 has a comparatively small outer diameter and is thus subjected to significantly lower centrifugal forces than a rectifier 6' from the prior art, which was arranged to date outside of the rotor shaft 4.

An optimal utilization of an installation space unused to date within the rotor shaft 4 and thus the option of being able to construct the synchronous machine 2 more compactly as a whole.

A simple assembly of the rectifier 6 by means of an insertion into the longitudinal slits 24.

An improved cooling option of the rectifier 6, associated with a high performance of the synchronous machine.

The invention claimed is:

1. A rotor for an externally excited synchronous machine, comprising:

rotor windings arranged on a rotor shaft having at least one cavity, a rectifier electrically connected to the rotor windings, wherein the rectifier is at least partly arranged in the cavity of the rotor shaft;

wherein:

an at least partly hollow shaft end comprising an interior space is provided, wherein the rectifier is arranged in the interior space of the shaft end and the shaft end is at least partly arranged in the at least one cavity of the rotor shaft, or a sleeve is provided, wherein the rectifier is arranged in the sleeve and the sleeve is at least partly arranged in the at least one cavity of the rotor shaft; and wherein:

longitudinal slits running in the axial direction, into which the rectifier formed as a plug-in printed circuit board is inserted and fixed, are provided in a wall of the at least one cavity, of the interior space or of the sleeve, or longitudinal openings, which run in the axial direction and which are injection-molded with plastic, are provided in a wall of the at least one cavity or of the interior space, wherein longitudinal slits running in the axial direction, into which the rectifier formed as a plug-in printed circuit board is inserted and fixed, are provided in the plastic.

2. The rotor according to claim 1, wherein the rectifier formed as the plug-in printed circuit board comprises diodes arranged on one side or on both sides.

3. The rotor according to claim 1, wherein the rectifier has electrical contacts arranged on the longitudinal end side for contacting with a contacting counterpiece.

4. The rotor according to claim 3, wherein:

the electrical contacts are formed as contact pins, as plug contacts or as spring contacts, and/or latching elements are provided on the rectifier and mating latching elements on the contacting counterpiece for locking together, or vice versa.

5. The rotor according to claim 1, further comprising an end piece or a cover that fixes the rectifier.

6. The rotor according to claim 1, further comprising a thermally conductive and electrically insulating material arranged between the rectifier and the rotor shaft.

7. The rotor according to claim 1, further comprising cooling ducts for a coolant provided in the rotor shaft or the shaft end.

8. The rotor according to claim 1, wherein a fluid as coolant is applied directly to the rectifier.

9. The rotor according to claim 1, wherein the rectifier is arranged adjacent to an axis of rotation of the rotor shaft.

10. An externally excited synchronous machine, comprising:

a rotor that can be electrically supplied with current, the rotor including:

rotor windings arranged on a rotor shaft having at least one cavity, a rectifier electrically connected to the rotor windings, wherein the rectifier is at least partly arranged in the cavity of the rotor shaft, an at least partly hollow shaft end comprising an interior space, wherein the rectifier is arranged in the interior space of the shaft end and the shaft end is at least partly arranged in the at least one cavity of the rotor shaft, longitudinal slits running in the axial direction, into which the rectifier formed as a plug-in printed circuit board is inserted and fixed, are provided in a wall of the at least one cavity or of the interior space, and a rotary transformer rotor of a rotary transformer comprising a secondary coil and a rotary transformer stator.

11. The externally excited synchronous machine according to claim 10, wherein the rotary transformer stator has a primary coil and a transformer core of a magnetic core material.

12. A traction motor of a motor vehicle, comprising:

a rotor that can be electrically supplied with current, the rotor including:

rotor windings arranged on a rotor shaft having at least one cavity, a rectifier electrically connected to the rotor windings, wherein the rectifier is at least partly arranged in the cavity of the rotor shaft, wherein:

an at least partly hollow shaft end comprising an interior space is provided, wherein the rectifier is arranged in the interior space of the shaft end and the shaft end is at least partly arranged in the at least one cavity of the rotor shaft, or a sleeve is provided, wherein the rectifier is arranged in the sleeve and the sleeve is at least partly arranged in the at least one cavity of the rotor shaft; and wherein:

longitudinal slits running in the axial direction, into which the rectifier formed as a plug-in printed circuit board is inserted and fixed, are provided in a wall of the at least one cavity, of the interior space or of the sleeve, or longitudinal openings, which run in the axial direction and which are injection-molded with plastic, are provided in a wall of the at least one cavity or of the interior space, wherein longitudinal slits running in the axial direction, into which the rectifier formed as a plug-in printed circuit board is inserted and fixed, are provided in the plastic, and a rotary transformer including a rotary transformer rotor comprising a secondary coil and a rotary transformer stator.

13. The externally excited synchronous machine according to claim 10, wherein the rectifier formed as the plug-in printed circuit board comprises diodes arranged on one side or on both sides.

14. The externally excited synchronous machine according to claim 10, further comprising an end piece or a cover that fixes the rectifier.

15. The externally excited synchronous machine according to claim 10, wherein the rectifier has electrical contacts arranged on the longitudinal end side for contacting with a contacting counterpiece.

16. The externally excited synchronous machine according to claim 15, wherein the electrical contacts are formed as contact pins, as plug contacts or as spring contacts.

17. The externally excited synchronous machine according to claim 15, wherein latching elements are provided on the rectifier and mating latching elements on the contacting counterpiece for locking together, or vice versa.

18. The traction motor according to claim 12, further comprising a thermally conductive and electrically insulating material arranged between the rectifier and the rotor shaft.

19. The traction motor according to claim 12, further comprising cooling ducts for a coolant provided in the rotor shaft or the shaft end.

20. The traction motor according to claim 12, wherein the rectifier has electrical contacts arranged on the longitudinal end side for contacting with a contacting counterpiece.

* * * * *